United States Patent [19]
Fonda-Bonardi

[11] Patent Number: 4,808,070
[45] Date of Patent: Feb. 28, 1989

[54] FLUID BEARING

[76] Inventor: G. Fonda-Bonardi, 1450 23rd St., Santa Monica, Calif. 90404

[21] Appl. No.: 85,704

[22] Filed: Aug. 17, 1987

[51] Int. Cl.$^4$ .............................................. F04D 29/04
[52] U.S. Cl. ................................ 415/110; 415/170 R; 384/115; 384/273; 384/397
[58] Field of Search ........... 415/104, 106, 110, 170 R, 415/111; 384/115, 113, 273, 272, 397

[56] References Cited

U.S. PATENT DOCUMENTS

| 1,860,817 | 5/1932 | Peterson | 415/104 |
| 3,210,044 | 10/1965 | Mori | 415/106 |
| 3,795,427 | 3/1974 | Licht et al. | 384/397 |
| 4,090,743 | 5/1978 | Suzuki et al. | 384/113 |
| 4,196,945 | 4/1980 | Miller, Jr. | 384/397 |
| 4,493,610 | 1/1985 | Iino et al. | 415/104 |
| 4,602,873 | 7/1986 | Izumi et al. | 384/115 |
| 4,693,617 | 9/1987 | Roemer et al. | 384/397 |

FOREIGN PATENT DOCUMENTS

| 1802033 | 4/1970 | Fed. Rep. of Germany | 384/115 |
| 1366075 | 6/1964 | France | 384/397 |
| 390197 | 3/1933 | United Kingdom | 384/273 |

Primary Examiner—Robert E. Garrett
Assistant Examiner—John T. Kwon
Attorney, Agent, or Firm—James E. Brunton

[57] ABSTRACT

A gas bearing including a support having a longitudinally extending cylindrical bore, of a predetermined diameter and an elongated generally cylindrical shaft rotatable within the bore of the shaft being of a predetermined diameter less than the diameter of the bore in the support. The outer surface of the shaft is uniquely provided with a plurality of circumferentially spaced, longitudinally extending recesses of a predetermined depth, each of which defines an elongated, generally radially outwardly extending step of a predetermined height. The outer surface of the shaft is also provided with a plurality of circumferentially spaced, longitudinally extending grooves of a predetermined depth disposed proximate the steps. At least one end of each of the grooves is in communication with a source of gas at a predetermined pressure so that as the shaft rotates the gas will be drawn into the space between the inner walls of the cylindrical bore and the outer surfaces of the shaft and will function to maintain concentricity of the shaft.

9 Claims, 2 Drawing Sheets

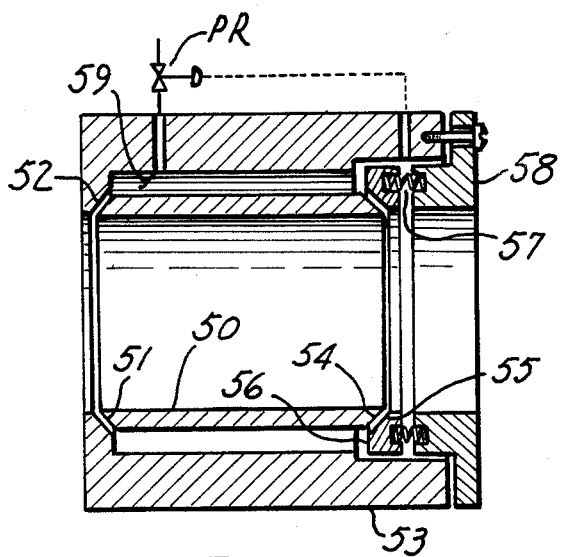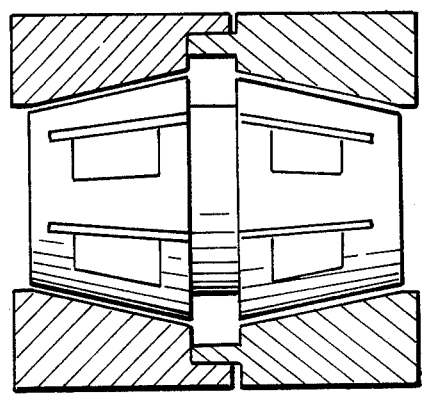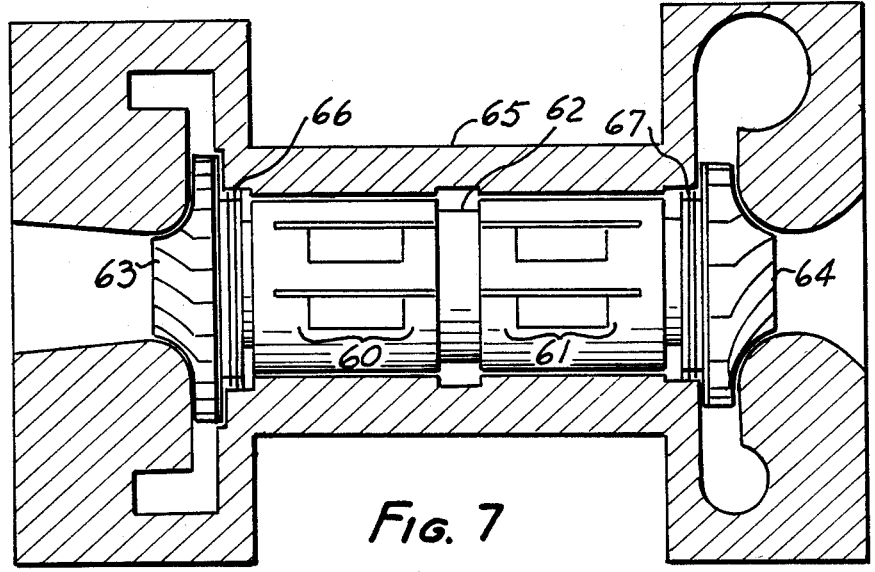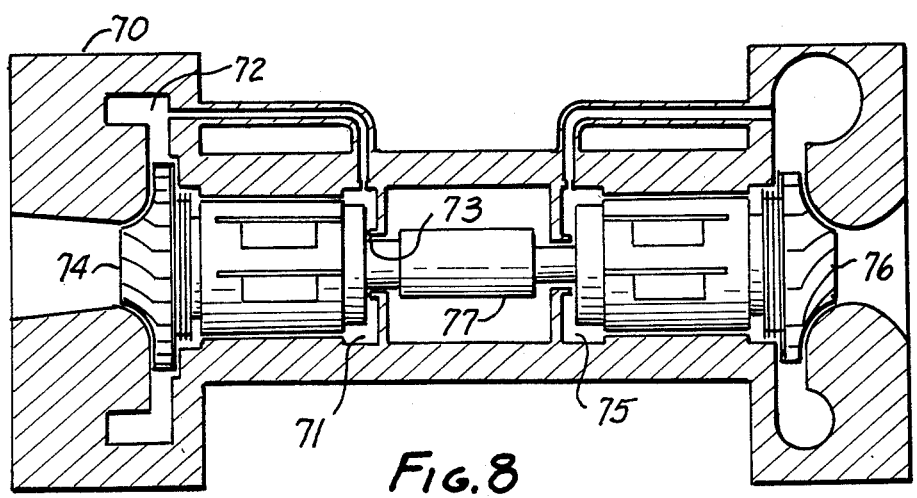

FLUID BEARING

BACKGROUND OF THE INVENTION

1. Field of the Invention

The present invention relates generally to fluid bearings for shafts rotating at high speeds. More particularly, the invention concerns gas bearings having special shaft geometries for generating dynamic pressures within the interior of the bearing to precisely control the gap between the shaft and journal as the shaft rotates.

2. Discussion of the Prior Art

Gas bearings have been in use for many years in applications wherein a shaft rotates at very high speeds within a stationary journal. The well known advantages of these devices are very low frictional losses and lack of a complex oil lubricating system, usually comprising an oil reservoir, oil pump, filters, coolers, pressure gauges, valves and related hardware. The equally well known disadvantages of the devices are stringent requirements on manufacturing dimensional tolerances and surface finishes, with attendant high production costs. Further, such devices are plagued by the possibility of catastrophic damage due to the intrusion into the device of extremely small foreign objects, such as dust particles. Another disadvantage is the possibility of hydrodynamic instabilities under certain operating conditions.

In all fluid supported bearings, the hydrodynamic action which generates dynamic pressures within the space between the shaft and the journal is caused by the motion of a viscous fluid (whether oil or gas) which is forced to flow in a gap of varying width by the relative motion of the shaft within the journal. In the simplest case of a cylindrical shaft rotating in a cylindrical journal, the variation in the width of the gap is the consequence of an eccentricity of the shaft in the journal, such as may be caused by the weight of the shaft or other externally applied forces. This simplest bearing is stable under certain conditions, but becomes unstable when the combination of applied forces and rotational speed exceeds a certain value. Furthermore, the load-carrying capacity of the simple gas bearing is not very high.

Considerable ingenuity has been exercised in introducing modifications to the cylindrical surface of the journal to achieve a more effective variation of gap width for smaller values of eccentricity. These prior art endeavors have resulted in a variety of shapes being proposed, as for example, three-lobe bearings, lemon-shaped bearings, half lemon-shaped bearings, and displaced bearings. However, in the case of gas bearings, the problem is complicated by the low viscosity of the gas, typically on the order of one-thousandth of that of oil. As is well known, the clearance varies with the cube root of the viscosity for equivalent bearing stiffness. Therefore, gaps, or clearances, are required on the order of one-tenth or less than that required for oil bearings. Additionally, the requirement for such very close clearances creates a serious problem when temperature differences cause a differential expansion of shaft and journal. For example, if the shaft is colder than the journal, the clearance may become unacceptably large, with consequent instability. In the opposite situation, the shaft may grow larger than the journal and the bearing can seize.

Solutions to the aforementioned problems have been attempted by forming the journal out of a series of flexible, elastic elements, or foils, which conform to the dimensions of the shaft and at the same time provide by their overlap and/or deflection the required wedge-shaped variation of gap width. Exemplary of such an approach are the devices disclosed in U.S. Pat. No. 3,795,427, issued to Licht et al., and references therein.

Another class of prior art gas bearings has been suggested wherein the journal retains a cylindrical shape and the gap-varying geometry is transferred to the shaft. In this class of devices, the shaft is modified by providing recessed areas of various shapes, such as chevrons, herring bones, helices, and the like. However, these types of bearings suffer from disadvantages similar to those previously discussed, since the operating temperature difference between shaft and journal can cause either instability or seizure.

The fluid bearing of the present invention belongs to the general class described in the preceding paragraph, since in the preferred form of the invention the journal is smooth and round, and the shaft carries the gap-controlling geometry. However, as will become readily apparent from the discussion which follows, the shape and size of the recesses provided in the shaft surface differ markedly from common practice and are such that stability is enforced with allowable clearances much greater than that found in comparable prior art gas bearings. Consequently, the manufacturing tolerances are correspondingly relaxed, and the bearing can function properly over a much larger temperature range without difficulty. Further, the adverse effects of dust in the gas are minimized. In addition, a simple, automatic method is provided for adjusting the clearance in case the temperature variation exceeds that which can be accommodated in the basic journal.

SUMMARY OF THE INVENTION

It is an object of the present invention to provide a fluid bearing which retains all of the advantages of prior art gas bearings, but obviates the difficulty and expense of manufacture of such devices by substantially relaxing the dimensional tolerances required.

Another object of the invention is to provide a fluid or gas bearing of the aforementioned character which is intrinsically stable under widely varying operating conditions.

Still another object of the invention is to provide a gas bearing of the class described which is of simple, straight-forward design, and embodying a minimum number of component parts.

A further object of the invention is to provide a gas bearing which is highly reliable and requires minimum maintenance.

BRIEF DESCRIPTION OF THE DRAWINGS

FIG. 6 is a longitudinal cross-section of a bearing embodying a compliant journal with specially configured control elements attached thereto.

FIG. 7 is a cross-sectional view of two axially displaced bearings supporting two wheels of the character as may be used in a turbocompressor.

FIG. 8 is a cross-sectional view showing two bearing pairs in a thrust-compensating arrangement.

FIG. 9 is a fragmentary cross-sectional view illustrating an alternate type of thrust-absorbing arrangement.

DESCRIPTION OF THE INVENTION

Figure 1:
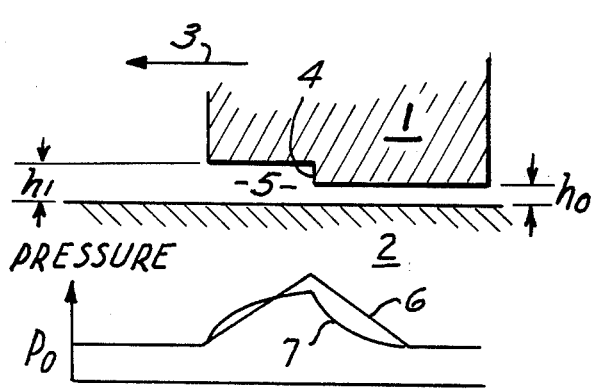
FIG. 1 is a generally diagramatic view illustrating the configuration and operation of the so-called Rayleigh step which forms the scientific basis for the bearing of the present invention.

Referring to the drawings and particularly to FIG. 1, the basic configuration of the so called Rayleigh step is shown in the upper part of the Figure. A slider 1 is assumed in motion above a fixed plane 2, with the motion assumed to be parallel to plane 2 and in the direction indicated by arrow 3. The height of step 4 is the difference h1-h0 of the height of the clearance to the left and the clearance to the right. The space 5 between the slider and the base plane is filled with a viscous fluid which is dragged to the left by the motion of the slider. The relative motion of the fluid in the gap or clearance 5 generates a pressure gradient and a pressure distribution with a maximum just under the step. Curve 6 shows the pressure distribution obtaining for an incompressible fluid such as oil, curve 7 shows that obtaining for a compressible fluid such as a gas. In either case the pressure outside the slider is constant and equal to the environment pressure PO. Lord Rayleigh showed in 1918 that this configuration provides the highest load carrying capacity for any given bearing area. The load bearing capacity is equal to the bearing area multiplied by the average pressure under the bearing, i.e. the integral of the pressure distribution; this is a function of h1 and h0 and increases as h0 tends to zero. Thus the net force upwards on the slider increases as the slider is pushed down by an increased load.

Figure 2:
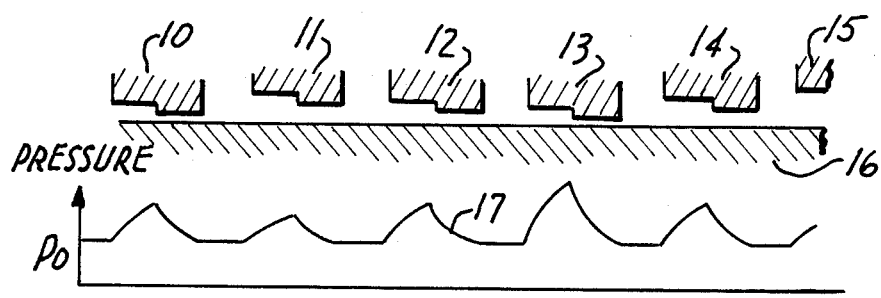
FIG. 2 is a generally diagramatic view showing an indefinite series of Rayleigh steps, conceived and portrayed in the drawing as an unrolled cylindrical bearing.

FIG. 2 shows a sequence of Rayleigh step sliders 10, 11, 12, 13, 14 and 15 placed at different heights above a common plane 16. The sliders are assumed to be rigidly connected to each other and to be moving with the same speed to the left as viewed in FIG. 2. Each slider develops a pressure distribution for a compressible fluid as shown by curve 17. The maximum pressure under each slider is higher if the height of the slider above the plane is smaller.

Figure 3:
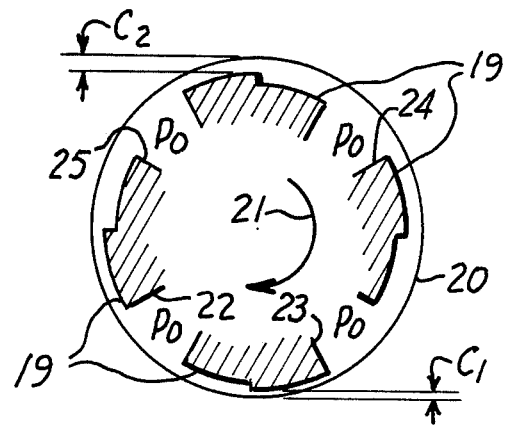
FIG. 3 is a generally diagramatic view showing the series of Rayleigh steps rolled up to form a cylindrical bearing, with pressure-equalizing grooves interspersed therebetween.

FIG. 3 shows a number of Rayleigh step sliders 19 wrapped around a shaft and rigidly connected to it. The sliders are depicted as being inserted in a round journal 20 representing the base plane wrapped in a cylinder. The shaft is assumed to rotate in the direction of arrow 21. The shaft is shown eccentric to the journal with the clearance c1 at the bottom being smaller than the clearance c2 at the top, as would be the case for a heavy shaft. Consequently the pressure developed at the bottom is higher than the pressure developed at the top and the difference between the pressures supports the shaft against the force of gravity. If the shaft is also subjected to other, externally applied forces, the location of the minimum clearance depends on the resultant of said forces, and the pressure reaction again opposes said resultant. Since a component of the pressure distribution integral is always opposite to the vectorial eccentricity of the shaft in the journal, the bearing exhibits a restoring force similar to that of a non-linear spring, and a non-linear spring constant can be defined for it.

The result described in the preceding paragraph holds true only if the pressure distribution under each step slider develops above a constant pressure PO between sliders, exactly as the pressure distribution 7 develops above the external pressure PO as depicted in FIG. 1. If the pressure between individual sliders is not externally controlled, each slider develops a pressure gradient starting from the end pressure of the previous slider, and the first slider from that of the last one around the shaft. Since the loop is closed, local pressure variations average out and the bearing stiffness is substantially reduced. Furthermore, the bearing exhibits a kind of instability quite similar to that of the plain cylindrical bearing without steps. This is generally true of all bearing having periodic variations of gap height around the shaft and/or journal, regardless of the geometric details, as long as there are no provisions for maintaining a constant reference pressure at selected, periodic locations between the periodic variations of gap height.

In light of the fact that there may be various sources of bearing instability, depending on geometry, load, speed, and the like provisions for an externally maintained reference pressure within the bearing are a necessary, but not sufficient condition for absolute stability of the bearing. Therefore gaps 22, 23, 24 and 25 (FIG. 3) which communicate with the exterior of the bearing and maintain pressure PO at the beginning of each slider are essential for the stability of the bearing. As will be better understood from the description which follows, the vector relationship between the integral of the pressures around the shaft and the instantaneous eccentricity of the bearing of the present invention is such that the bearing is always stable.

Figure 4:
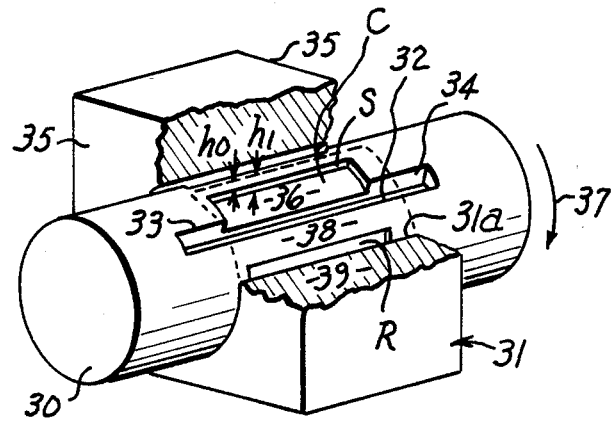
FIG. 4 is a perspective view of a specially configured, stepped shaft disposed within a support or journal which has been broken away to illustrate the relationship of the pressure-equalizing grooves and the Rayleigh steps with the journal around them.

Turning now to FIG. 4, a simple form of the bearing of the present invention is there illustrated and comprises an elongated, generally cylindrical shaft 30 rotatable with a long longitudinally extending bore 31 formed in a support or journal 39. Bore 31 is generally circular in cross section at any point and is of a predetermined diameter. The inner surface of the bore is preferably generally smooth and uninterrupted.

Shaft 30 is of a predetermined diameter less than the diameter of bore 31a and defines an elongated outer surface. Formed in the outer surface of the shaft are a plurality of circumferentially spaced, longitudinally extending recesses or cavities C of a predetermined depth. Each cavity C defines along one margin thereof a radially outwardly extending step S of a predetermined height presently to be defined.

As depicted in FIG. 4, the basic clearance between the shaft 30 and the inner surface of bore 31a is h0 and the clearance between the bottom of the recess shown in FIG. 4 and the inner surface of bore 31a is h1. Therefore, the height of step S is h1 minus h0 (see also FIG. 1).

Also formed in shaft 30 are a plurality of circumferentially spaced, longitudinally extending groves or channels 32. Grooves 32 are disposed proximate the steps S in the manner shown in FIG. 4 and are axially longer that the solid portion or body of support 39. With this construction at least one of the ends 33 and 34 of each groove extends beyond the longitudinally spaced face(s) 35 of the support and freely admits the fluid under pressure PO disposed outside the journal into the recess R. A rotation of the shaft in the direction of arrow 37 generates in the recesses R and in the area 38 between them a pressure distribution similar to that shown in FIG. 2, if viewed as being wrapped around the shaft, with resultant excellent characteristics of bearing stiffness and stability.

It is to be understood that, conceptually, the performance of the bearing of the present invention does not depend on whether the steps and the pressure equalizing grooves are in a shaft, which cooperates with a smooth journal, or whether they are in a journal, which cooperates with a smooth shaft. In practice, however, it is much easier to machine and etch the external surface of the shaft, and to grind the internal surface of the journal, than to do the opposite. Furthermore, a smooth journal lends itself to the automatic method of clearance adjustment for compensation of thermal expansion differences as will presently be described.

In practice, the steps of the device may also be either imbedded into or cast integrally with the shaft or journal and may be of various lengths and heights depending upon end application requirements. Grooves, or channels 32 may also be formed in various ways well known to those skilled in the art.

The basic bearing of the invention as described in the preceding paragraphs permits a much wider variation of clearance, due to manufacturing tolerances as well as thermal expansion, than any prior art gas bearings. In fact, the bearing has been experimentally shown to run well with a variation of basic clearance h0 over a ratio of 5:1, which is unheard of even in the case of prior art oil bearings.

Figure 5:
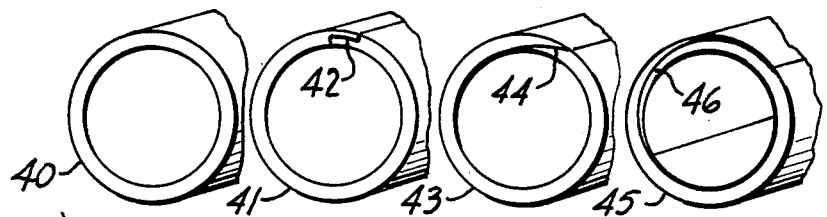
FIG. 5 is a view showing in perspective various possible forms of a compliant support or journal for automatic clearance adjustment.

In certain applications, such as cryogenic applications, extreme changes of temperature may cause an unacceptable change of clearance between the shaft and journal. Such changes may be unacceptable not so much because of instability, but because the uncertainty in the position of the shaft may require unacceptably wide clearances elsewhere in the machine, such as in the labyrinth seals. In such instances the clearance in the bearing can be automatically controlled by a compliant support or journal wherein the journal is permitted to change its diameter in response to an externally applied pressure. The requirement that the journal changes its diameter while maintaining a substantially circular cross-section can be met in several ways, as for example, by constructing the journal in the form of a relatively thin walled, longitudinally stepped tube. Alternatively, the thin walled tube can be split lengthwise in such a manner as to prevent leakage of gas from the inside to the outside and vice versa. FIG. 5 shows the end views of a series of journals of the character described. Numeral 40 identifies the end view of an unsplit journal. Numeral 41 identifies the end view of a stepped journal with a step cut 42 reminiscent of the cut in a piston ring. Numeral 43 identifies a diagonal cut 44, and numeral 45 identifies a cut 46 similar to cut 44 but extended over a much larger angular coverage. For manufacturing purposes this latter type of journal can be rolled from a metal strip until the rolled strip overlaps itself for one or more turns, and then the rolled cylinder can be machined inside and out on a lathe and finally ground on the inside to finished dimensions.

Referring to FIG. 6, which illustrates one form of a compliant support of a bearing of the present invention, (the shaft is omitted for clarity) the support includes an outer housing 53 within which is mounted a compliant cylindrical journal or support 50, which is expandable radially outwardly in response to fluid under pressure dispensed between the shaft and the inner surface of the journal. In the embodiment of the invention shown in FIG. 6, the compliant cylindrical journal is retained in housing 53 by biasing means for insuring roundness and concentricity while permitting a small amount of radially outwardly expansion or contraction of the journal. This biasing means is here provided as a spring loaded mechanism the details of construction of which will presently be described. As seen in FIG. 6, the ends of the journal 50 are machined as conical surfaces, of which one, designated as 51, rests against a complementary conical surface 52 of the housing, while the other end 54 is pressed upon by a complementary conical surface 55 of a ring 56. This in turn is slidably contained in housing 53, and is pressed against journal 50 by a set of springs 57 which rest against a closure 58.

In FIG. 6 the gaps between surfaces 51 and 52 and between surfaces 54 and 55, are shown slightly open for purposes of clarity, but are in fact tightly closed after assembly by the action of the springs 57. In operation any small expansion of the diameter of journal 50 will push ring 56 axially outwardly, thereby further compressing the springs 57. Similarly, any small contraction of the journal will result in the extension of the springs 57 which will in turn axially push ring 56 so as to remain in contact with journal 50.

Expansion and contraction of the diameter of the journal against the urging of the biasing means occurs in response to a change in the pressure difference between the interior and exterior of the journal, namely the difference between the dynamic pressure generated by the steps inside the journal, and the pressure existing in cavity 59 disposed between the compliant journal and the housing 53. The pressure within cavity 59 can be controlled in a variety of ways so that some negative feedback from a clearance sensor changes the applied pressure in such a direction as to maintain the clearance h0 more nearly constant.

One control means for controlling the pressure within cavity 59 comprises a simple differential pressure regulator PR, (FIG. 6) such as to maintain the pressure in cavity 59 a constant increment above the pressure PO existing at the ends of the journal. Since any decrease of the clearance h0 (e.g. from an increase in temperature of the shaft) results in a large increase of the average dynamic overpressure distribution in the Rayleigh steps, the journal will be caused to expand against the (constant) external pressure in cavity 59; and vice-versa. On the other hand, an increase of clearance h0 (e.g. from cooling of the shaft) results in a large decrease of average dynamic overpressure, with consequent contraction of the journal. In either case the change of clearance is much reduced, and the shaft remains more nearly concentric with the housing. Differential pressure regulator PR is of a character well known to those skilled in the art and is readily commercially available.

Turning now to FIG. 7, there is shown two bearings 60 and 61 on the same shaft 62 for the purpose of obtaining rigidity against conical vibration of the shaft in an application with two overhung weights, such as a turbocompressor with turbine wheel 63 and compressor wheel 64. For simplicity, a rigid journal 65 is illustrated rater than a compliant one of the character previously described. Such a rigid journal could only be used if the change of temperature is not excessive, or if a relatively large variation of clearance could be tolerated insofar as the remainder of the machine is concerned. However, this arrangement cannot absorb a thrust generated by substantial static pressure differences between the turbine housing and the compressor housing, and therefore could be used only in cases where such differences are very small or are very carefully compensated by precise design of labyrinth seals 66 and 67.

In instances where conditions as described in the preceding paragraph do not apply, special means for absorbing thrust must be used. For example, as shown in FIG. 8 the turbo compressor can be divided into two subassemblies, each of which is full thrust compensated, so that no thrust is transmitted by the shaft from one subassembly to the other. In the construction shown in FIG. 8, the turbine subassembly 70 contains for example a thrust balancing volume 71, wherein the pressure is automatically adjusted by gas being supplied from a high pressure source 72 (the turbine inlet) through a fixed orifice, and being exhausted through a variable orifice 73 controlled by the axial position of the bearing and wheel assembly. This results in a thrust gas bearing capable of balancing the thrust due to the static pressure on the face of wheel 74. Similarly a volume 75 on the compressor side performs the same function against the static pressure on the face of the compressor wheel 76. It is to be understood that the thrust bearings can be combined in other ways with the radial gas bearings, so long as the entire thrust of each subassembly is fully absorbed by the combined radial and thrust bearing, and no thrust is transmitted to the other subassembly. In this case the coupling 77 transmits torque only, and can be any of many flexible couplings commercially available. This obviates the very careful concentricity alignment that would otherwise be required between the turbine and the compressor subassemblies.

As shown in FIG. 9, an alternative way of combining a radial with a thrust bearing is to machine the pressure equalizing grooves and the Rayleigh steps on a conical shaft, and grind the journal in a hollow conical shape to match. Two such conical bearings can then be mounted back-to-back to provide a thrust capacity in both directions.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A bearing comprising:
   (a) a support having a longitudinally extending bore, generally circular in cross-section at any point, said bore being of a predetermined diameter and defining an inner surface, said support being disposed within a gaseous atmosphere and including longitudinally spaced faces;
   (b) an elongated generally cylindrical shaft rotatable within said bore of the support, said shaft being of a predetermined diameter less than the diameter of said bore in said support and defining an outer surface, said outer surface of said shaft having:
      (i) a plurality of circumferentially spaced, longitudinally extending recesses of a predetermined depth, each said recess defining an elongated, generally radially outwardly extending step of a predetermined height; and
      (ii) a plurality of circumferentially spaced, longitudinally extending grooves of a predetermined depth disposed proximate said steps, said grooves including an end portion extending beyond one of said longitudinally spaced faces of said support into said gaseous atmosphere whereby gas will be drawn into said recesses upon rotation of said shaft relative to said support, at least one end of each of said grooves being in communication with a source of fluid at a predetermined pressure.

2. A bearing as defined in claim 1 in which said support is compliant whereby said bore is expandable outwardly in response to fluid under pressure disposed between said shaft and inner surface of said support.

3. A gas bearing as defined in claim 2 including means for controlling the pressure of gases within said recesses.

4. A gas bearing as defined in claim 2 further including means for yielding resisting diametrical expansion of said support and for maintaining substantial concentricity thereof.

5. A gas bearing as defined in claim 2 in which said support comprises a metal strip rolled into a generally cylindrical configuration.

6. A gas bearing as defined in claim 2 in which said support comprises a thin walled tubular member having a longitudinally extending cut through the wall thereof.

7. A gas bearing as defined in claim 6 in which said longitudinally extending cut extends radially outwardly through said wall.

8. A gas bearing as defined in claim 6 in which said longitudinally extending cut extends diagonally outwardly through said wall, causing the edges to overlap by a predetermined angular extent.

9. A bearing comprising:
   (a) a support having a longitudinally extending bore, generally circular in cross-section at any point, said bore being of a predetermined diameter and defining an inner surface, said support being disposed within a gaseous atmosphere and including longitudinally spaced faces;
   (b) an elongated generally cylindrical shaft rotatable within said bore of said support, said shaft being of a predetermined diameter less than the diameter of said bore in said support defining an outer surface, said outer surface of said shaft having:
      (i) a plurality of circumferentially spaced, longitudinally extending recesses of a predetermined depth, each said recess defining an elongated, generally radially outwardly extending step of a predetermined height; and
      (ii) a plurality of circumferentially spaced, longitudinally extending grooves of a predetermined depth disposed proximate said recesses, said grooves including an end portion extending beyond one of said longitudinally spaced faces of said support into said gaseous atmosphere whereby gas will be drawn into said recesses upon rotation of said shaft relative to said support.

* * * * *